(12) United States Patent
Sarrayedine et al.

(10) Patent No.: US 12,345,912 B2
(45) Date of Patent: Jul. 1, 2025

(54) METHOD FOR MANUFACTURING A SET OF OPTICAL GUIDE MICROSTRUCTURES

(71) Applicant: OPTINVENT, Rennes (FR)

(72) Inventors: Khaled Sarrayedine, Rennes (FR); Simon Julien, Rennes (FR); Yao Liu, Rennes (FR)

(73) Assignee: OPTINVENT, Rennes (FR)

( * ) Notice: Subject to any disclaimer, the term of this patent is extended or adjusted under 35 U.S.C. 154(b) by 539 days.

(21) Appl. No.: 17/677,417

(22) Filed: Feb. 22, 2022

(65) Prior Publication Data

US 2022/0357503 A1    Nov. 10, 2022

(30) Foreign Application Priority Data

Feb. 23, 2021    (EP) ..................................... 21305215

(51) Int. Cl.
*F21V 8/00* (2006.01)
*B29D 11/00* (2006.01)
(Continued)

(52) U.S. Cl.
CPC ...... *G02B 6/0065* (2013.01); *B29D 11/00663* (2013.01); *B29D 11/00932* (2013.01);
(Continued)

(58) Field of Classification Search
CPC .. G02B 6/0065; G02B 6/0016; G02B 6/0038; G02B 27/0081; G02B 27/0172;
(Continued)

(56) References Cited

U.S. PATENT DOCUMENTS 8,662,959 B2 * 3/2014 Kuriyama ................ B23B 1/00
    82/134
9,207,662 B2   12/2015 Keller et al.
(Continued)

FOREIGN PATENT DOCUMENTS

CN      110244399 A    9/2019
EP      0 440 578 A1   8/1991
(Continued)

OTHER PUBLICATIONS

Jiang et al.; "Novel tool offset fly cutting straight-groove-type micro structure arrays;" Journal of Materials Processing Tech.; 2021; pp. 1-14; vol. 288, No. 116900.

(Continued)

*Primary Examiner* — Alex B Efta
*Assistant Examiner* — Alexander S Wright
(74) *Attorney, Agent, or Firm* — Williams Mullen; R. Brian Drozd (57) ABSTRACT

A diamond turning station having a drum able to be rotated about an axis C and a diamond tip. A piece to be machined P is installed on the drum as follows: the piece to be machined P is offset by a distance D from the rotation axis of the drum; the piece to be machined P is placed so that there is a mean angle Theta between the axis C and a cutting profile corresponding to the active surfaces, the angle Theta being as follows: Theta=arccos (D/Ry), where Ry is a radius of curvature required in the long direction of the microstructures. Next, the diamond tip is moved along the cutting profile of the microstructures, while actuating the rotation of the drum, so as to machine all the microstructures on the surface of the piece to be machined P.

12 Claims, 7 Drawing Sheets

(51) Int. Cl.
*C03C 19/00* (2006.01)
*C03C 27/10* (2006.01)

(52) U.S. Cl.
CPC ............. *C03C 19/00* (2013.01); *C03C 27/10* (2013.01); *G02B 6/0016* (2013.01)

(58) Field of Classification Search
CPC ............ G02B 5/1852; B29D 11/00663; B29D 11/00932; C03C 19/00; C03C 27/10
See application file for complete search history.

(56) References Cited

U.S. PATENT DOCUMENTS

| | | |
|---|---|---|
| 10,203,437 B2 | 2/2019 | Tanaka et al. |
| 2014/0140091 A1 | 5/2014 | Vasylyev |
| 2017/0322417 A1* | 11/2017 | Sekiguchi ................ G02B 5/09 |

FOREIGN PATENT DOCUMENTS

| | | |
|---|---|---|
| WO | 2009/074638 A2 | 6/2009 |
| WO | 2012/136470 A1 | 10/2012 |

OTHER PUBLICATIONS

Jul. 28, 2021 Search Report issued in European Patent Application No. 21 30 5215.

\* cited by examiner

Fig. 1

PRIOR ART

Fig. 2A

PRIOR ART

Fig. 2B

PRIOR ART

METHOD FOR MANUFACTURING A SET OF OPTICAL GUIDE MICROSTRUCTURES

TECHNICAL FIELD

The present invention relates to the field of manufacturing microstructures of optical guides serving to extract images injected into and transported in these optical guides.

PRIOR ART

An optical guide serves to transport, by successive total internal reflections, light signals constituting an image injected from an injection zone towards an extraction zone. The optical guide being formed from a transparent material (plastics material, glass) the successive total internal reflections of the light signals take place in a guide zone typically in the form of a plate with parallel faces. Such optical guides are found integrated in ocular vision systems more commonly referred to as informative spectacles.

The image to be transported is injected into the optical guide by means of a collimation device up against the guide at the injection zone. The collimation device comprises a luminous image source providing the image. The luminous image source is for example of the LCoS (Liquid Crystal on Silicon), LCD (Liquid Cristal Display) or OLED (Organic Light-Emitting Diode), µLED (Micro Light Emitting Diode) or MOEMS (Micro Opto Electro Mechanical System) type. The collimation device further comprises an optical system based on lenses, and optionally mirrors, which makes it possible to project this image in the form of a collimated beam, which is then introduced into the optical guide through the injection zone.

The extraction zone comprises a set of microstructures constituting an array of semi-reflective reflectors parallel to each other, on the surface of the optical guide. These microstructures consist of prisms having an adapted angle, enabling the light beam to emerge from the optical guide towards the eye of a user.

Figure 1:
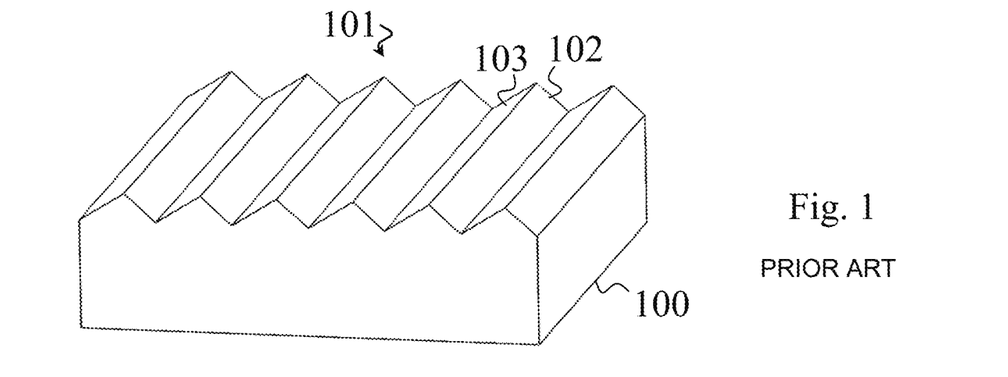
FIG. 1 schematically illustrates microstructures of an optical-guide extraction zone, according to the prior art.

A similar arrangement is presented in the patent document WO 2009/074638 A1. In the same principle, FIG. 1 schematically illustrates an arrangement where a set of juxtaposed microstructures form an optical-guide extraction zone. An optical-guide portion 100 is presented therein, comprising microstructures 101 forming an array of semi-reflective reflectors on the surface of the optical guide. These microstructures 101 are hollow projecting prisms, and consist of an alternation of surfaces 103 and 102 tilted with respect to the opposite face of the optical guide. The surfaces 103 form conjointly, by means of a semi-reflective coating, the extraction surface for the images injected into the optical guide, i.e. the aforementioned array of reflectors. Here active surfaces A are spoken of. The surfaces 102 form conjointly the transparent surface making it possible, by means of a cover piece dealt with below, to obtain a see-through effect, supplemented by the semi-reflective character of the active surfaces A. Passive surfaces B are here spoken of.

Figure 2A:
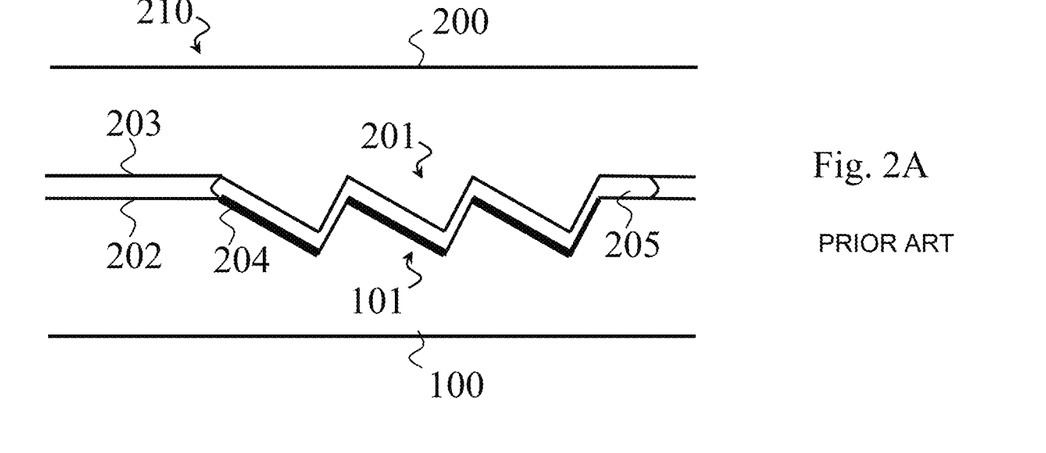
FIG. 2A schematically illustrates another arrangement of an optical-guide extraction zone, according to the prior art.

Another arrangement making it possible to obtain the see-through effect is presented in the patent document WO 2012/136470 A1. This makes it possible to see the image transported by the light beam superimposed on the scene beyond the optical guide. The view of the see-through scene is in particular allowed by the semi-reflective character of the array of reflectors. This arrangement comprises a first optical-guide piece 100 with an extraction zone composed of microstructures 101 in substance according to the scheme in FIG. 1. The arrangement described introduces a second optical-guide piece 200, also referred to as a cover piece, comprising on the surface microstructures 201 with a form complementary to the microstructures 101 of said extraction section, as illustrated schematically on FIG. 2A. An optical guide 201 appears therein, resulting from an assembly of the first piece 100 and of the second piece 200. The semi-reflective coating 204 mentioned above also appears therein. In addition, a layer of glue 205 extends at least between the microstructures 101 and 201, so that every microstructure 101 in said extraction section is separated from its complementary microstructure 201 by a transparent medium with a substantially constant thickness.

Figure 2B:
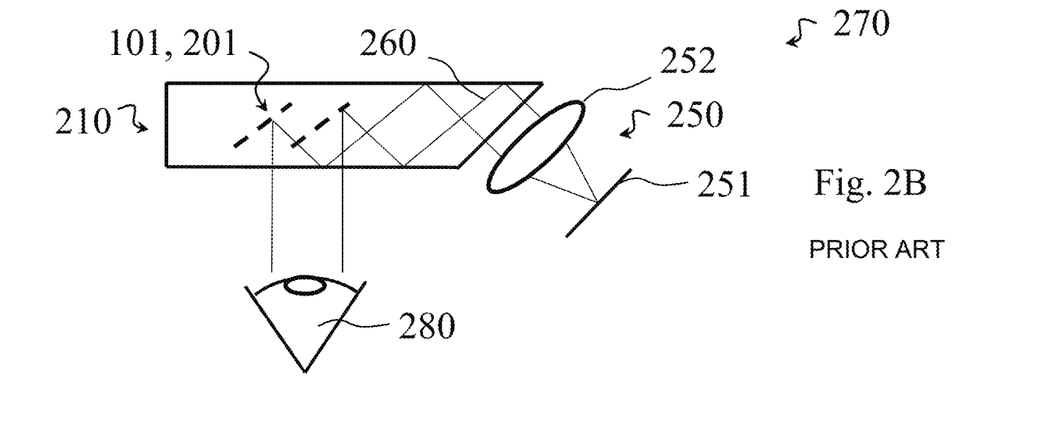
FIG. 2B schematically illustrates an arrangement of an optical-guide extraction zone, according to the prior art.

The microstructures of such optical guides can be manufactured by machining, but are generally manufactured by means of a technique of plastic injection moulding, compression injection moulding, hot embossing or finally by a technique of thermal forming, or ultraviolet radiation forming, of monomers. For this purpose, a metal impression (also referred to as an insert) (for example made from steel or aluminium) is manufactured with the negative shape of the structure of the optical guide, in order to serve as a mould (after typically application of a layer of nickel phosphorus for steel impressions). This type of insert must be manufactured with very precise methods in order to limit surface irregularities to the maximum extent. Some applications involve dimensional tolerances of surface shapes much lower than the guided wavelength λ (for example less than λ/5) and also a very low roughness (for example less than 10 nm), in order to have good sharpness of projected image. Thus the semi-reflective surfaces of the microstructures, the role of which is to extract the image towards the eye of a user of the optical guide, must be produced precisely. This is because the image guided in the optical guide by successive total internal reflections is collimated to infinity, as illustrated schematically on FIG. 2B. An optical device 270 appears therein, obtained by adjoining a collimation device 250 to the optical guide 210. The collimation device 250 comprises, as already mentioned, a luminous image source 251 supplying the image to be injected into the injection zone of the optical guide 210 and an optical system based on lenses 252 projecting this image in the form of a beam 260 collimated to infinity and transported by successive internal reflections in the optical guide 210 as far as the extraction zone obtained by means of the superimposition of the microstructures 101, 201. By means of the optical device 270 optical device 270, the see-through effect and the projection of the transported image are obtained superimposed in the eye of the user 280.

Thus, each pixel of the image being transported in the optical guide by a pencil of light rays parallel to each other, the image is therefore guided in the form of parallel light rays, and any defect in producing the microstructures may cause a mixing of these light rays with those of the neighbouring pixels, thus degrading the quality of the projected image.

Manufacturing these inserts is a technical challenge. There exist techniques that consist of forming the microstructures by scraping by means of a dedicated diamond tool, or the cutting is done by one or two sides of a diamond tip, or rotating a diamond blade to cut an entire surface of a prism. These techniques may however prove to be insufficiently precise in terms of surface evenness and/or surface roughness. For more precision, there exists a technique of machining by diamond tip, referred to as "single point diamond turn cut". In this technique, a fine diamond tip (with a radius of curvature that is clearly defined and calibrated) cuts the surface of the substrate by rotating the piece to be cut. The diamond moves slowly in order to impart the cutting height. "Diamond turning" is spoken of. This technique is used for cutting optical surfaces with symmetry of revolution of very high precision. In diamond turning, the cutting time is determined by the rotation speed of the drum carrying the piece to be cut. At 1000 revolutions per minute, the travel time of one revolution is approximately 60 ms. With a cutting step of 0.5 µm at each turn and a length to be cut of 20 mm, then the corresponding cutting time is 40 minutes. And several passes are necessary for manufacturing optical components with symmetry of revolution, or their corresponding inserts.

The manufacturing time by machining by diamond tip considerably increases when prismatic structures with parallel planar surfaces, such as the one in FIG. 1, are to be produced. This is because, to produce such shapes, another machining process is used: straight-line diamond machining, by means typically of a shaping machine. Unlike diamond turning, straight-line diamond machining is a much longer process than diamond turning. The reason is that, for each sweep line of the diamond, the latter must stop and start again in an opposite direction, which therefore increases the sweep time of each pass. Thus an insert may take up to several weeks or even several months for manufacture thereof. In addition, this type of machining suffers from a calibration drift over time that is due to the variation in temperature of the environment, which either impairs the quality of the surfaces or requires recalibration operations.

The problem is therefore posed of providing a solution for manufacturing a set of optical-guide microstructures forming an array of reflectors intended to allow an extraction of light signals transported in the optical guide, with a surface quality equivalent to diamond machining, but with a shorter production time. It is desirable to provide a solution that is suitable for manufacturing optical-guide microstructures as close as possible to those disclosed in the patent documents WO 2009/074638 A1 (schematically repeated in FIG. 1) and WO 2012/136470 A1 (schematically repeated in FIG. 2A).

DISCLOSURE OF THE INVENTION

A method is proposed for manufacturing a set of optical-guide microstructures, or of its moulding insert, by using a diamond turning station provided with a drum that can be rotated about an axis C and a diamond tip, each microstructure having a prismatic shape with two surfaces with a first surface here called active surface intended to receive a semi-reflective treatment to extract an image injected and propagated by successive total internal reflections in the optical guide, and a second surface called passive surface without reflective treatment, the microstructures being juxtaposed with each other, the manufacturing method comprising the following steps:

installing a piece P to be machined on the drum as follows: the piece P to be machined is offset by a distance D from the rotation axis of the drum, the distance D being the distance that separates the axis C and a reference frame fixed in relation to the microstructures to be machined; and the piece P to be machined is placed so that there is a mean angle Theta between the axis C and a cutting profile corresponding to the active surfaces, the angle Theta being as follows:

Theta=arccos (D/Ry)

where Ry is a required radius of curvature in the long direction of the microstructures;

moving the diamond tip along the cutting profile of the microstructures by actuating the rotation of the drum so as to machine all the microstructures on the surface of the piece P to be machined.

Thus, by positioning the piece P to be machined in this way, it is possible to produce, by diamond turning, microstructures very similar to those discussed in the introductory part. The difference in shape is negligible in the optic field. The quality of surfacing is equivalent to diamond machining, but the use of diamond turning considerably reduces the production time necessary.

According to a particular embodiment, said fixed reference frame is the geometric centre of all the microstructures to be machined.

According to a particular embodiment, the radius Ry tends towards infinity and the piece P to be machined is placed at a mean angle Theta equal to 90° so as to form planar active surfaces. According to a variant, the cutting profile of the active surfaces forms an arc of a circle of radius Rx and the piece P to be machined is placed at a mean angle Theta of less than 90° so as to form concave active surfaces. According to another variant, the cutting profile of the active surfaces forms an arc of a circle of a radius Rx and the piece P to be machined is placed at a mean angle Theta greater than 90° so as to form convex active surfaces.

According to a particular embodiment, the radius Rx and the radius Ry have the same value. In a variant, the radius Rx and the radius Ry have different values.

A method for manufacturing an optical guide comprising the following steps is also proposed: manufacturing a first piece on the surface of which a set of microstructures is formed by applying the method mentioned above; applying a semi-reflective treatment to the surfaces of the microstructures intended to extract an image injected and propagated by successive total internal reflections in the optical guide; manufacturing a second piece on the surface of which a set of microstructures complementary to the microstructures of the first piece is formed; gluing the first piece and the second piece together, the microstructures on the surface of the first piece being glued facing their complementary microstructures on the surface of the second piece.

According to a particular embodiment, the method comprises the following steps for manufacturing the second piece:

installing another piece P' to be machined on the drum as follows: the other piece P' to be machined is offset by a distance D' from the rotation axis of the drum, the distance D being identical to the distance D used for manufacturing the first piece; and the other piece P' to be machined is placed so that there is a mean angle Omega between the axis C and another cutting profile corresponding to the surfaces intended to be placed facing the active surfaces of the microstructures of the first piece, the angle Omega being as follows:

Omega=π-Theta=π-arccos (D/Ry)

moving the diamond tip along said other cutting profile of the microstructures by actuating the rotation of the drum so as to machine all the microstructures on the surface of the other piece P' to be machined, said other cutting profile being geometrically complementary to the cutting profile used for machining the first piece.

A method for manufacturing an optical device comprising the following steps is also proposed: manufacturing an optical guide by applying the method as mentioned above; and assembling the optical guide and a collimation device, so that the collimation device injects an image, in the form of a beam collimated to infinity, through an injection zone of the optical guide, so that this image is transported by successive total internal reflections as far as an extraction zone of the optical guide where the glued microstructures are arranged to extract the image from the optical guide in see-through superimposition.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 3:
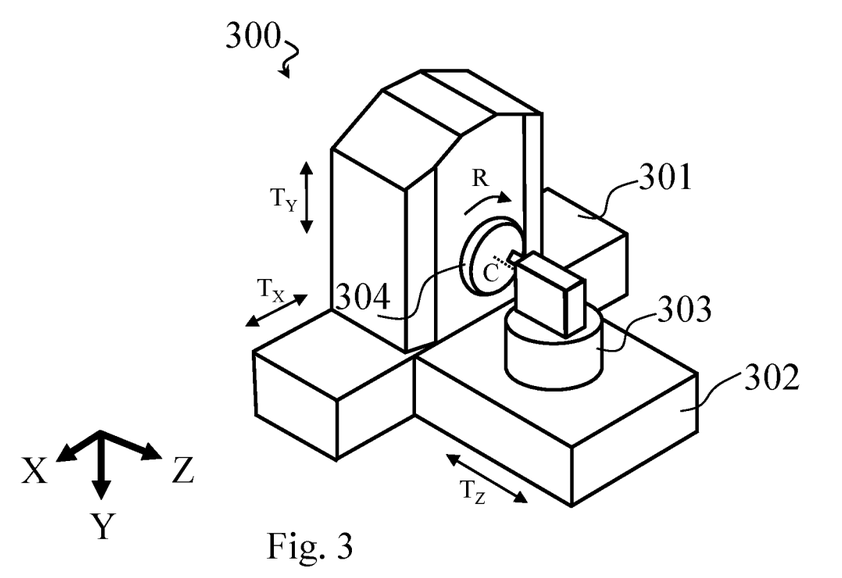
FIG. 3 schematically illustrates a diamond turning station.

FIG. 3 thus schematically illustrates a diamond turning station 300. The diamond station comprises a first chassis part 301 comprising a drum 304 on which a piece P to be cut can be attached. The drum 304 can be rotated with respect to the first chassis part 301 about an axis C (for example horizontal) so as to rotate R the piece P about the axis C. The diamond turning station comprises a second chassis part 302 comprising a cutting tool 303 with diamond tip.

The cutting tool 303 with diamond tip can be moved and locked with respect to rotation about an axis perpendicular to the axis C (for example vertical), so as to be able to adjust the presentation angle of the cutting tool 303 with regard to the rotating piece P.

The first chassis part 301 and the second chassis part 302 can be moved in translation with respect to each other on a direct orthonormal reference frame X, Y, Z. Thus the first chassis part 301 can make translations $T_X$ along the axis X and translations $T_Y$ along the axis Y, and the second chassis part 302 can make translations $T_Z$ along the axis Z.

As with any numerical control machine, the movements of the cutting tool 303 relative to the piece P are controlled by a list of timestamped coordinates generated by a computer. As a general rule, the piece to be created is first of all described by means of a CAD (computer-aided design) model and then converted into instructions that can be interpreted by a controller or a processor of the numerical control machine that manages in particular the movement commands of the cutting tool 303 and/or of the first chassis part 301 and/or of the second chassis part 302.

Figure 4:
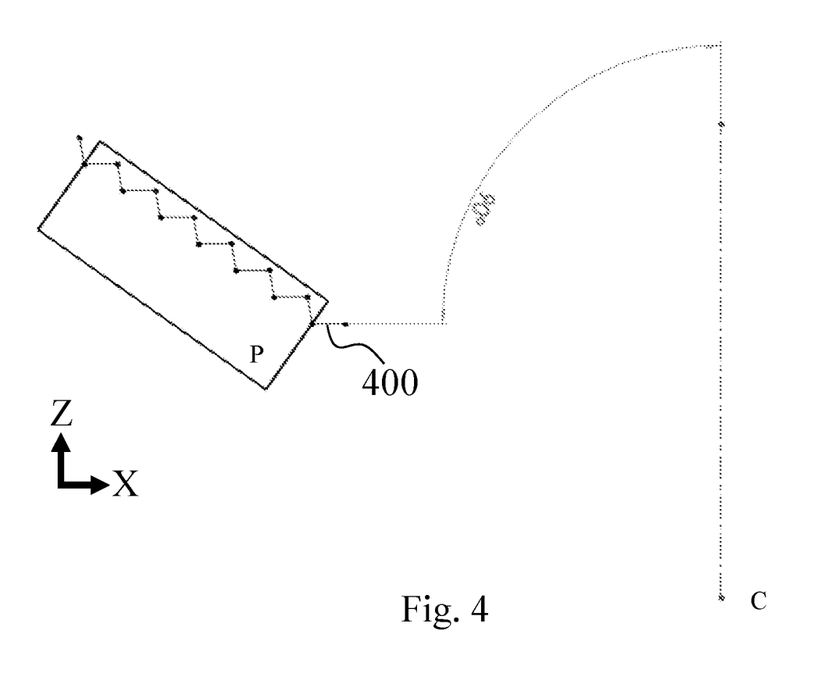
FIG. 4 schematically illustrates the placement, with respect to a rotation axis of a drum of the diamond-turning station, of the surface of a piece to be machined to form microstructures of optical-guide extraction zones, according to an embodiment of the invention.

The movements of the cutting tool 303 relative to the piece 3 take place step by step (for example in movement steps of 0.5 μm on the axis X and/or on the axis Y and/or on the axis Z) according to a cutting profile, as schematically illustrated on FIG. 4, where a cutting profile 400 of microstructures for an optical-guide extraction zone is presented. The cutting profile is the diagram reproduced over the entire width of the piece P in a revolution about the axis C (by definition of a turning operation). By following the cutting profile 400, the top part of the piece P on FIG. 4 is abraded during the diamond turning.

The extraction zone, consisting of a set of juxtaposed prismatic microstructures, is to be formed on the surface of the optical guide. The cutting profile can be applied directly to the optical guide to be created or to its insert (complementary form).

On the diagram in FIG. 4, the piece P to be machined is placed in the following manner on the diamond turning station 300:

the piece P is placed at a distance D from the rotation axis C of the drum 304, the distance D being the distance that separates the axis C and a reference frame fixed in relation to the set of microstructures to be machined. Preferentially, this fixed reference frame is the geometric centre of the set of microstructures to be machined, i.e. the geometric centre of the extraction zone. This fixed reference frame may be another reference point with a position predefined in relation to the set of microstructures to be machined. For example, a point on an edge of the set of microstructures, or a point around the set of microstructures on the piece P. It should be noted that the distance D is limited by the physical capacities of the diamond turning station 300, in particular the dimension of the drum 304, as well as by the dimensions of the piece P.

the piece P to be machined is placed so that there is an angle Theta=90° between the axis C and the cutting profile of the active surfaces A to be formed.

Thus, considering a parallelepipedal piece P, the piece P is tilted with respect to the plane of the drum 304 (the piece P is raised on the external side of the drum 304).

The distance D is such that all the microstructures to be machined are on the same side of the rotation axis C. The distance D is defined according to the physical capacities of the diamond turning station 300 and the dimensions of the piece P to be machined, so as to minimise the variations in thickness between the middle and the ends of the microstructures (in the direction of their length). This is because the placement of the piece P with respect to the rotation axis C of the drum 304, and the machining by turning, mean that the thickness of the microstructures differs between the middle of each microstructure and its ends. This is a significant specificity of the manufacturing method disclosed here.

It is thus possible to create an optical-guide extraction zone according to a scheme of prismatic microstructures alternating active surfaces A (intended conjointly for extracting the injected image) and passage surfaces B (intended conjointly for the see-through vision), or its corresponding insert. The profile of each active surface A (or of its insert profile) is perpendicular to the rotation axis C, which makes it possible to obtain a planar surface. The piece P to be cut is offset with respect to the rotation axis C, which makes it possible to obtain, without recalibration of the diamond turning station 300, active surfaces A that are planar and parallel to each other. A counterweight can be placed on the drum 304 in a suitable manner so as to limit the vibrations when the piece P is rotated about the rotation axis C. The active surface A of each microstructure thus formed is produced by the rotation of the piece P about the rotation axis C and the translation of the cutting tool along the axis X. Therefore only two movements of freedom are needed for creating each active surface A. Each passive surface B for its part requires three movements of freedom: the rotation about the rotation axis C of the piece P and the translations of the diamond tip along the axes X and Z. Increasing the movements of freedom necessary for producing a surface increases the imprecision (addition of tolerances of all the movements of freedom necessary). In this approach, the defect in surface shape is therefore smaller on the active surfaces A than on the passive surface B, but the surface roughness is of the same quality.

Figure 5:
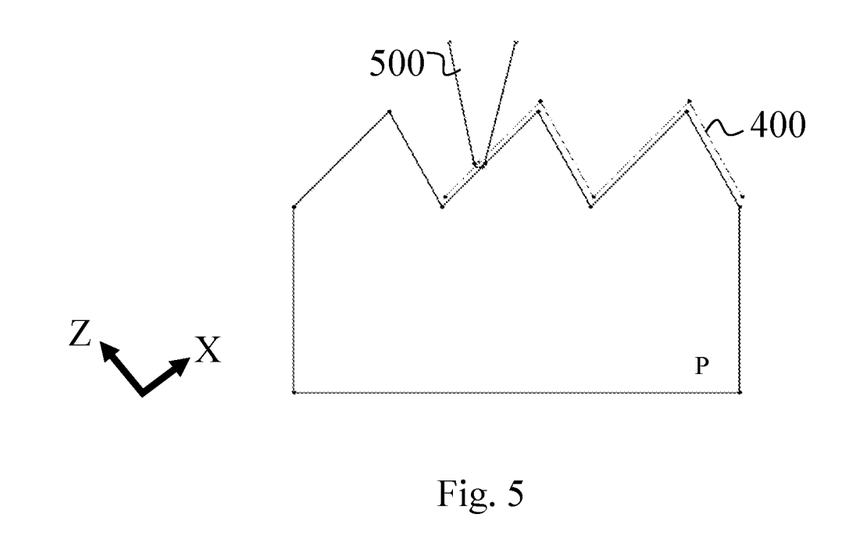
FIG. 5 schematically illustrates the following of a cutting profile by a diamond tip.

FIG. 5 schematically illustrates the following of a cutting profile by a diamond tip 500. As shown on FIG. 5, the cutting actually obtained is slightly offset with respect to the cutting profile 400 followed by the diamond tip 500. The diamond tip 500 has in fact a slightly rounded shape and the path followed by the diamond tip 500 is described with respect to the centre of this rounded part. Account is therefore taken of this offset related to the rounded shape of the diamond tip 500 when the diamond turning station 300 is programmed.

Figure 6:
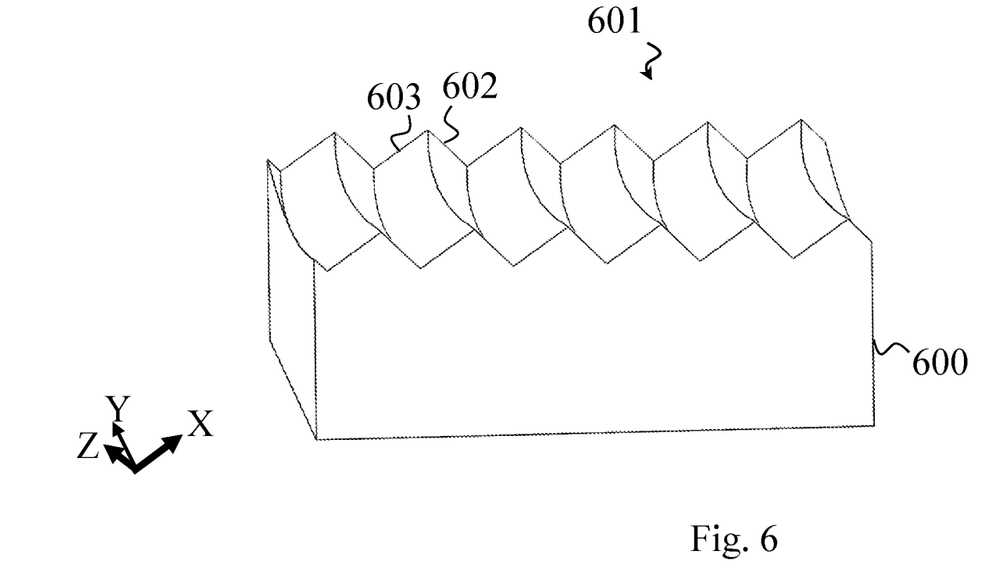
FIG. 6 schematically illustrates microstructures of an optical-guide extraction zone, obtained by operating the diamond-turning station in accordance with FIG. 4.

FIG. 6 schematically illustrates microstructures 601 obtained by applying the configuration of the diamond turning station 300 shown in FIG. 4, and by activating the rotation of the piece P about the axis C, and then manoeuvring the cutting tool 303 with diamond tip according to the cutting profile 400. The active surfaces A 602 thus obtained are slices of discs and the passive surfaces B 603 thus obtained are frustoconical or cylindrical surfaces. The further away the piece P is placed from the rotation axis C of the drum 304 (distance D), the closer the microstructures 601 are to straight microstructures.

The shapes thus obtained by diamond turning are not perfectly planar, but frustoconical (or cylindrical) on the passive surfaces B. These passive surfaces B are not intended to be provided with a reflective (or semi-reflective) treatment and do not serve to extract the image transported in the optical guide. In a preferred embodiment (as detailed below), the microstructures in the extraction zone are used by placing geometrically complementary microstructures facing them in order to afford a see-through effect. In this case, the surfaces facing said passive surfaces B are also preferentially devoid of any reflective (or semi-reflective) treatment. Then, although these passive surfaces B are not planar, the superimposition thereof on microstructures with complementary shapes ensures total and perfect transparency of the rays passing through the optical guide for see-through vision.

In certain applications, wherein the extracted image must be focused at a finite distance, the active surfaces A may be spherical. In the prior art, the progression of the relative movement of the diamond tip with the piece P along the axis Z is then synchronised with the rotation about the axis C. The diamond tip must in fact move in the course of the rotation about the axis C, during the cutting, in order to create a spherical profile; and along the axis X, the diamond tip also follows a spherical profile. However, in the present invention, because the piece P is tilted (linked to the angle Theta), there is no need for this synchronisation, the movements along the axis Z are then not synchronised with the rotation about the axis C (in the course of one and the same revolution of the drum 304).

It should be noted that numerical control machines are limited by three factors with regard to their movement on the axis Z: their maximum movement, their operating frequency and their acceleration. For example, the "Fast Tool Servo FTS 5000" machine from Precitech, which is dedicated to this type of application, has a maximum movement of 5000 μm, an operating frequency of 440 Hz for 100 μm of movement, and a maximum acceleration of 400 m/s$^2$. As for the conventional machines, these have a much lower maximum acceleration. It might therefore take approximately one month to machine an insert 40 mm wide, and for example just as long, with a machine having great possible acceleration, such as for example the "Fast Tool Servo FTS 5000" machine from Precitech, and almost a year for a conventional machine. Such manufacturing times are not industrially acceptable.

It is however possible to considerably reduce these manufacturing times by having recourse to diamond turning. In this case, the cutting profile of the active surfaces A forms an arc of a circle with a radius Rx (the radius along the axis X). When the cutting profile of the actives surface A is tilted by a mean angle Theta of less than 90° with respect to the rotation axis C of the drum 304 (and therefore of the piece P), the profile of the active surfaces A is concave. When the cutting profile of the active surface A is tilted by a mean angle Theta greater than 90° with respect to the rotation axis C of the drum 304 (and therefore of the piece P), the profile of the active surfaces A is convex.

Figure 7:
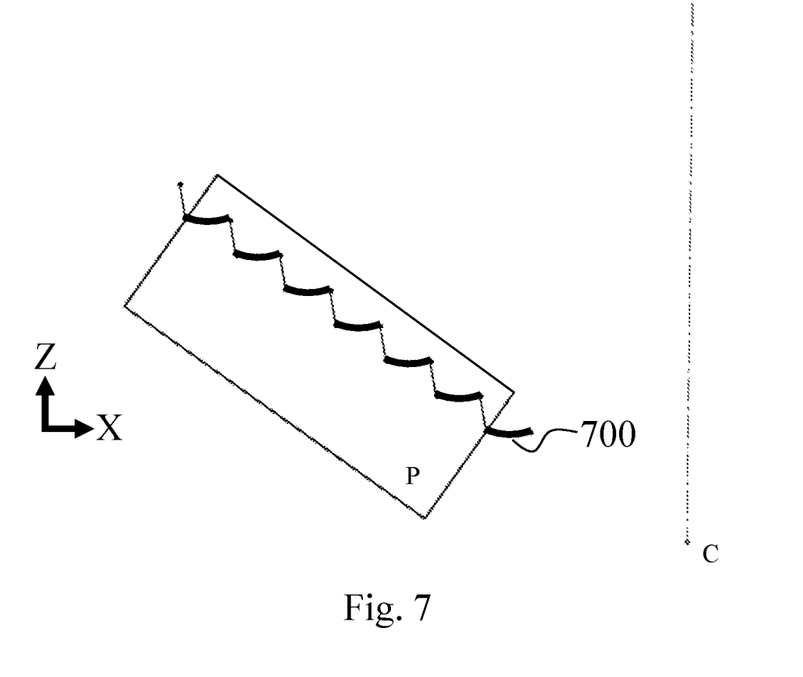
FIG. 7 schematically illustrates the placement, with respect to the rotation axis of the drum of the diamond-turning station, of a piece to be machined to form an optical-guide extraction zone, according to another embodiment of the invention.
Figure 8:
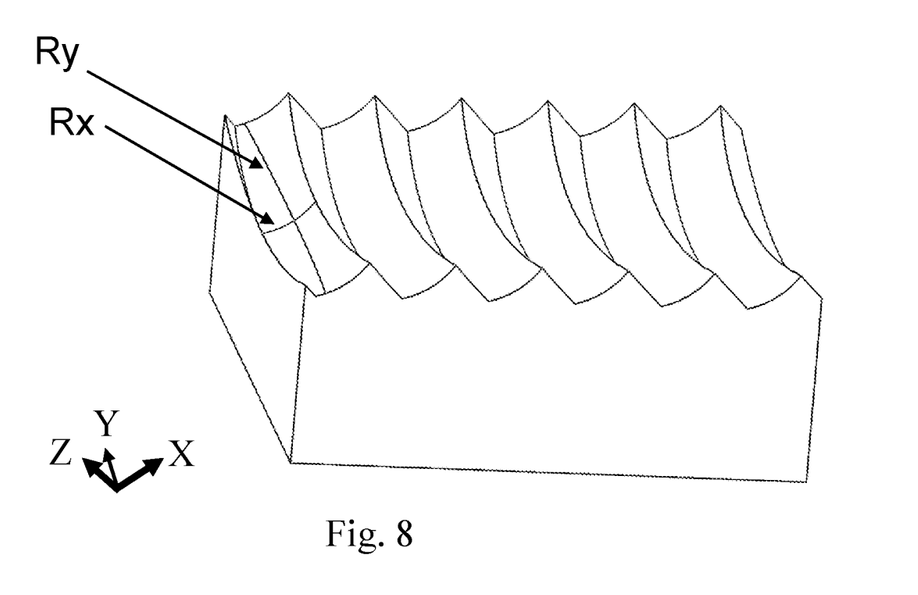
FIG. 8 schematically illustrates microstructures of an optical-guide extraction zone, obtained by operating the diamond turning station in accordance with FIG. 7.

The movements of the cutting tool 304 relative to the piece P also take place here, step by step (for example by movement steps of 0.5 μm on the axis X and/or on the axis Y and/or on the axis Z), according to a cutting profile 700, as illustrated schematically on FIG. 7. Following the cutting profile 700, the top part of the piece P on FIG. 7 is abraded during the diamond turning. FIG. 8 schematically illustrates microstructures 801 obtained by applying the configuration of the diamond turning station 300 shown on FIG. 7, and by activating the rotation of the piece P about the axis C, and then manoeuvring the cutting tool 303 with diamond tip according to the cutting profile 700.

The value of the angle Theta is to be adjusted according to a radius of curvature Ry (the radius along the axis Y) required in the long direction of the microstructures and according to the distance D between the axis C and the geometric centre of the set of microstructures (extraction zone of the optical guide) to be machined. To obtain a spherical surface (Rx=Ry), the centre of the circle of radius Ry is located on the rotation axis C of the drum 304.

The mean angle Theta is defined as follows:

$$\text{Theta}=\arccos{(D/Ry)}$$

It can moreover be noted that, when Ry tends towards infinity (cutting profile perpendicular to the axis C), Theta=90° is found as in FIG. 4.

Given that the distance D was defined with respect to a fixed reference frame of the set of microstructures to be machined, the angle Theta is consequently fixed for all the microstructures. Keeping the angle Theta fixed makes it possible not to have to recalibrate the diamond turning station 300 by passing from the machining of one microstructure to the machining of the following one. The active surfaces A thus obtained are therefore toric surfaces very close to spherical surfaces, and have slight astigmatism, which is negligible in this case. This astigmatism is smaller, the closer the fixed reference frame used for defining the distance D (and consequently the angle Theta) is to the geometric centre of the set of microstructures to be machined.

For example, to obtain an active surface A close to a portion of sphere with a radius of 300 mm, it is necessary to have R=100 mm, to place the piece P so as to intersect the active surface at a distance D=100 mm from the axis C and to have an angle Theta of 70.55°. This gives rise to an error in shape at 20 mm from the geometric centre (considering an insert of 40×40 mm) of approximately 40 nanometres, i.e. a maximum error of 0.4 mm on the radius of 300 mm. The error in shape is around 0.13%, which is known to be remarkable in the field of the manufacture of optical guides.

As already indicated, the distance D is such that all the microstructures to be machined are on the same side of the rotation axis C; in addition, the distance D is defined according to the physical capabilities of the diamond turning station 300 and the dimensions of the piece P to be machined, so as to minimise the variations in thickness between the middle and the ends of the microstructures (in the direction of their length). Here again, the placement of the piece P with respect to the rotation axis C of the drum 304, and the machining by turning, mean that the thickness of the microstructure differs between the middle of each microstructure and its ends.

It should therefore be noted that the inscription on the surfaces A and B of radii of curvature of a determined value is possible for the two directions, parallel or perpendicular to the cutting direction, and this for each prism. Thus it is possible to inscribe one radius of curvature Rx on the cutting profile forming the angle Theta with the axis C, and another different radius Ry along the axis Y along the microstructures. These radii Rx and Ry may be different for one and the same microstructure (prism), since they are independent (achievable by movements along distinct axes in the diamond turning station). This is because the radius Rx is inscribed by means of the cutting profile and the radius Ry is determined by the value of the tilt of the cutting axis, namely Theta. Since the active surfaces A of the microstructures thus obtained may have different values of radii Rx and Ry, it is possible to locally correct the vision of the user of the optical guide (and in particular a localised astigmatism). This is because the image extracted is provided with an optical power (after reflection of the microstructure) that will be able to be treated at each point of the extraction zone to focus an image at a fixed distance for a perfect eye, or to focus the image at the same fixed distance while taking account of an ophthalmic correction specific to the user by incorporating for each microstructure values Rx and Ry taking account of said ophthalmic correction (correction of the vision of the user).

In order furthermore to allow the see-through effect, a first piece of optical guide comprises an extraction zone formed by microstructures obtained as previously described in relation to FIGS. 4 to 8. A second optical-guide piece comprises geometrically complementary microstructures and overlaps the first piece. The refractive indices of the materials of the first piece and of the second piece, as well as the glue that assembles them, are substantially equal in order to ensure optical continuity.

Figure 9:
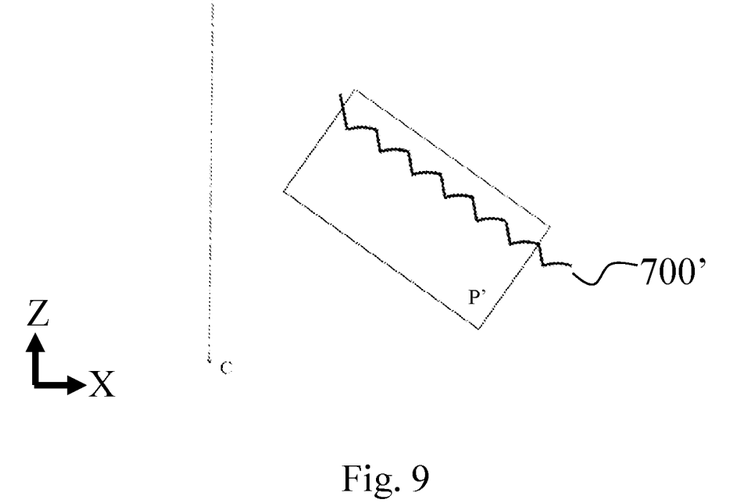
FIG. 9 schematically illustrates the placement, with respect to the rotation axis of the drum of the diamond turning station, of another piece to be machined, making it possible to form on its surface microstructures geometrically complementary to those obtained by operating the diamond turning station in accordance with FIG. 7.

FIG. 9 schematically illustrates the placement, with respect to the rotation axis C, of another piece to be machined P', making it possible to form on its surface microstructures geometrically complementary to those obtained by operating the diamond turning station in accordance with FIG. 7.

On the diagram of FIG. 9, this other piece to be machined P' is placed in the following manner on the diamond turning station 300:

this other piece to be machined P' is placed at a distance D' from the rotation axis C of the drum 304, the distance D' being the distance that separates the axis C and a fixed reference frame in relation to all the microstructures to be machined. This fixed reference frame is the same reference frame, in relation to the piece P', as the one used for the distance D in relation to the piece P, so that the microstructures of the piece P' are machined to allow their placement opposite those of the piece P. The distance D' is identical to the distance D. Preferentially, this fixed reference frame is the geometric centre of the set of microstructures to be machined. It should be noted that the distance D' is limited by the physical capacities of the diamond turning station 300, in particular the dimension of the drum 304, as well as by the dimensions of the piece P'.

the piece to be machined P' is placed so that there is an angle Omega=π-Theta between the axis C and the cutting profile of the surfaces of microstructures that are intended to be placed facing the active surfaces A of the microstructures of the piece P.

In other words, the angle Theta being as follows:

$$\text{Omega}=\pi-\text{Theta}=\pi-\arccos{(D/Ry)}=\pi-\arccos{(D'/Ry)}$$

It should be noted here that the radius Ry applied to the machining of the piece P' is identical to the one applied to the machining of the piece P, in order to obtain microstructures that are geometrically complementary.

The piece P' is machined following a cutting profile 700', as illustrated on FIG. 9. On FIG. 9, the piece P' is shown on the other side of the axis C with respect to the piece P shown on FIG. 7 (the machining means that the piece turns about the axis C).

Thus, with this positioning of the piece P' that takes account of the positioning of the piece P, if the passive surfaces B of the piece P face the axis C according to the positioning of the piece P and the cutting profile 700, the positioning of the piece P' and the cutting profile 700' mean that the surfaces of microstructures of the piece P' that are intended to be placed facing said passive surfaces B of the microstructures of the piece P have their back to the axis C.

The cutting profile 700' is geometrically complementary to the cutting profile 700 used for machining the microstructures on the surface of the piece P. Thus on FIG. 9 there appears the concave form of the surfaces that are intended to be placed facing the active surfaces A of the microstructures of the piece P, which for their part have a convex shape on FIG. 7. By following the cutting profile 700', the top part of the piece P' on FIG. 9 is abraded during the diamond turning.

Figure 10:
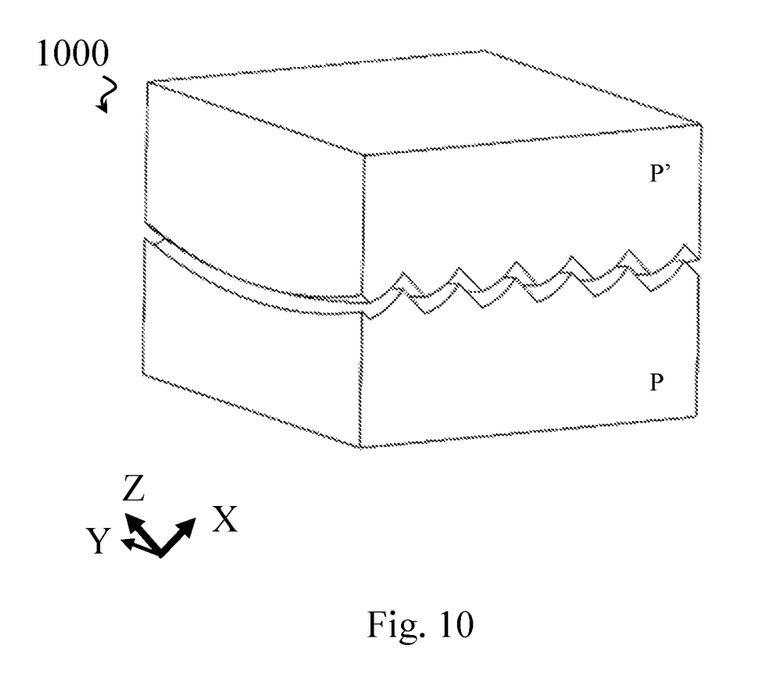
FIG. 10 schematically illustrates putting microstructures obtained by operating the diamond turning station in accordance with FIG. 7 and geometrically complementary microstructures obtained by operating the diamond turning station in accordance with FIG. 9 facing each other.

FIG. 10 schematically illustrates putting the microstructures of the two pieces P and P' of FIG. 9 facing each other after machining. An optical guide 1000 allowing the see-through effect (glue omitted on FIG. 10) and, superimposed, the extraction of the transported image is thus produced. As visible on FIG. 10, the tilt of the pieces P and P' at the angles Theta and Omega (respectively) gives rise to a variation in thickness, characteristic of the method used for manufacturing the microstructures (or the inserts thereof).

Figure 11:
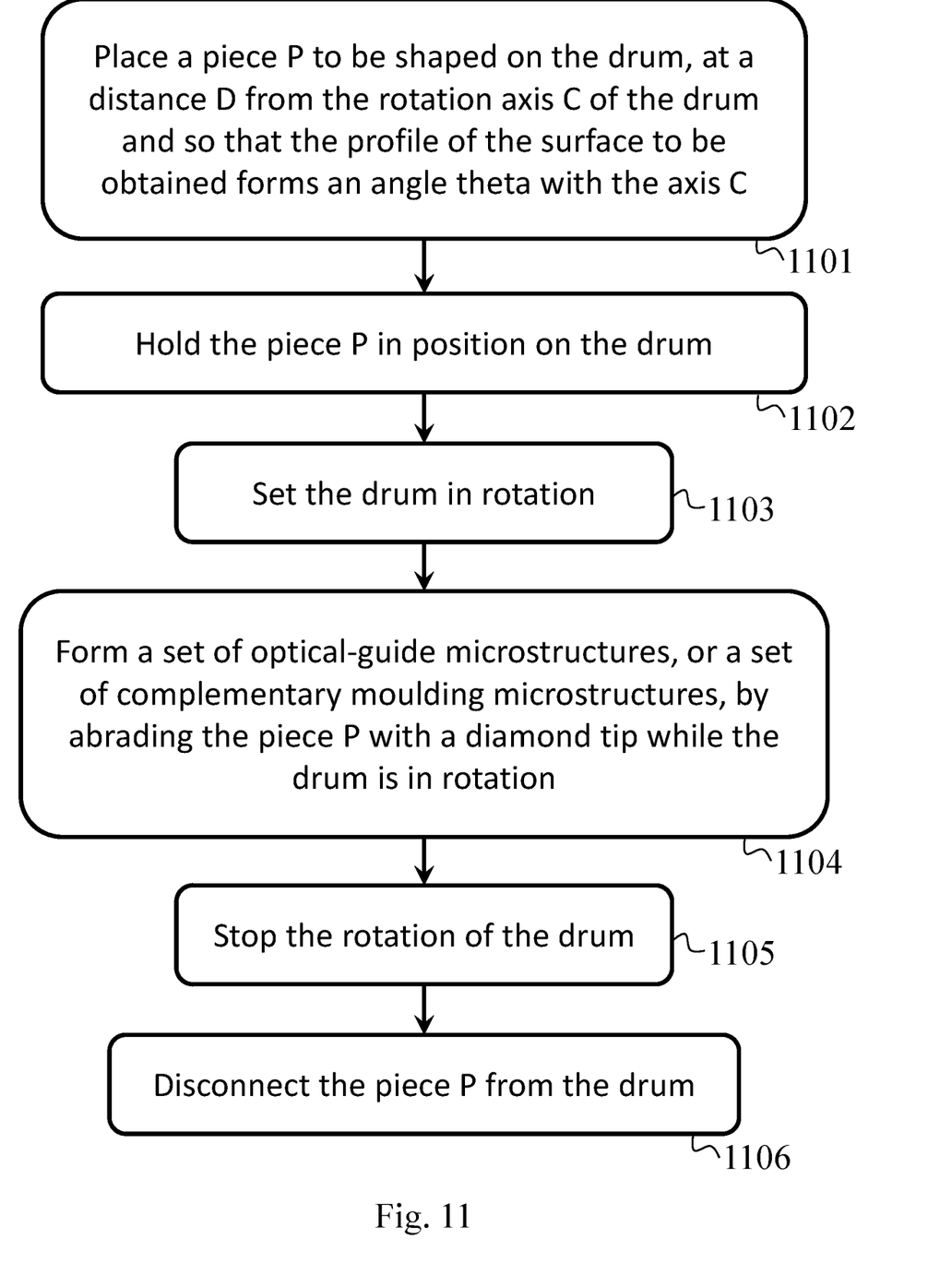
FIG. 11 schematically illustrates steps of a method for manufacturing microstructures of an optical-guide extraction zone, or of an insert for moulding such microstructures of an optical-guide extraction zone.

FIG. 11 schematically illustrates steps of the method for manufacturing microstructures of an optical-guide extraction zone, or of an insert for moulding such microstructures of an optical-guide extraction zone.

In a step 1101, the piece P is positioned on the drum 304 of the diamond turning station 300:

the piece to be machined P is offset by a distance D from the rotation axis of the drum 304, the distance D being the distance that separates the axis C and the geometric centre of the set of microstructures to be machined;

the piece to be machined P is placed so that there is a mean angle Theta=arccos (D/Ry) between the axis C and the cutting profile of the active surfaces A to be formed.

In a step 1102, the piece P is held in position on the drum. A counterweight may be added to compensate for the offset in mass due to the placement of the piece out of alignment with respect to the axis C of the drum and thus avoid vibrations caused.

Thus the piece to be machined P is placed and held in position as illustrated schematically on FIG. 4 or on FIG. 7.

In a step 1103, the drum is set in rotation about the axis C.

In a step 1104, cutting by diamond tip is implemented, and the diamond tip is moved along the required cutting profile. The microstructures of an optical-guide extraction zone, or of an insert for moulding such microstructures of an optical-guide extraction zone, are thus produced.

In a step 1105, the rotation of the drum is stopped.

In a step 1106, the piece P is disconnected from the drum.

The piece P thus produced can therefore serve for producing an optical guide and more particularly for producing extraction-zone microstructures, or their complementary microstructures (as in accordance with the principle of FIG. 10), or of their insert used in moulding and plastic injection operations. By being produced by diamond turning, the manufacture of these microstructures, as disclosed here, is sufficiently quicker than with straight-line diamond machining (shaping machine). Shapes (cylindrical, frustoconical) slightly different from those ideally required (respectively planar, spherical) for a given optical application are obtained. This difference in general shape of each microstructure does not cause any deformation of the see-through vision. This is because the rays of the see-through vision (the vision of the external scene) merely pass through the spherical-shaped structure without undergoing any modification in optical power or any deformation, since the refractive indices of the first piece of the optical guide (serving for the transport of the injected image), of the second piece of the optical guide (supplying the complementary microstructures) and of the glue that assembles them are substantially equal. As for the extracted image, this embodiment ensures that its light rays are certainly slightly diverted, in accordance with the curvature of the active surfaces A, but remain parallel to each other for each image pixel when they are transported by guidance in the optical guide.

Figure 12:
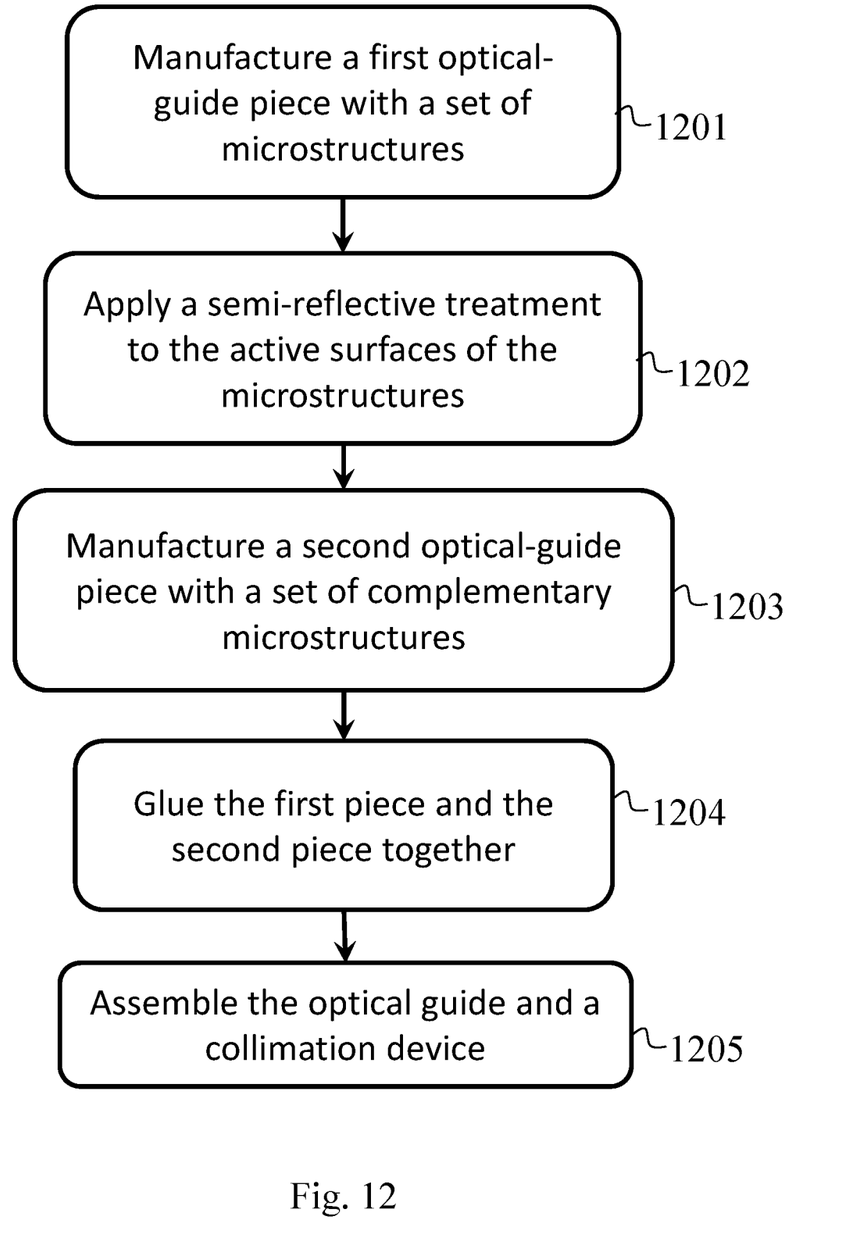
FIG. 12 schematically illustrates steps of a method for manufacturing an optical guide comprising two pieces, one piece comprising extraction-zone microstructures obtained by applying the method of FIG. 11 and the other piece comprising geometrically complementary microstructures.

FIG. 12 schematically illustrates steps of a method for manufacturing an optical guide comprising two pieces, a first piece comprising extraction-zone microstructures obtained by applying the method of FIG. 11 and a second piece comprising geometrically complementary microstructures.

In a step 1201, a first optical guide piece is manufactured, for example by machining a piece P made from plastics material or glass or by plastic injection method. The first piece comprises microstructures on the surface that serve for extracting an image injected into the optical guide. The microstructures, or a moulding insert of these microstructures, are obtained as detailed previously, more particularly in relation to FIG. 11.

Thus the microstructures of FIG. 6 or of FIG. 8 are obtained.

In a step 1202, a semi-reflective treatment (deposition) is applied to the active surfaces of the microstructures obtained during the step 1201.

In a step 1203, a second optical-guide piece is manufactured, for example by machining a piece P made from plastics material or glass or by a plastic injection method, as for the first piece manufactured at the step 1201. The second piece comprises microstructures on the surface that are geometrically complementary to those of the first piece. These complementary microstructures, or a moulding insert of these complementary microstructures, are preferentially obtained as detailed previously, more particularly in relation to FIGS. 9 and 11.

In a step 1004, the first piece manufactured at the step 1001 and the second piece manufactured at the step 1003 are glued together, the microstructures on the surface of the first piece being glued facing their complementary microstructures on the surface of the second piece, as illustrated on FIG. 10. The refractive indices of the materials used for manufacturing the first piece and the second piece, and of the glue that assembles them, are substantially equal in order to ensure optical continuity.

Next, an optical device can be manufactured by adding a collimation device to the optical guide. An assembly of the optical guide and of the collimation device is thus made, so that the collimation device injects an image, in the form of a beam collimated to infinity, through an injection zone of the optical guide, and so that this image is transported by successive total internal reflections as far as an extraction zone of the optical guide, where the glued microstructures are arranged to extract the image from the optical guide superimposed on a see-through effect. The assembly obtained repeats that of FIG. 2B, the optical guide and its microstructures being however manufactured as previously described in relation to FIG. 11.

The assembly of the optical guide and of the collimation device can next be integrated, with a luminous image source, in an augmented reality device, such as informative spectacles.

The invention claimed is:

1. A method for manufacturing a set of optical-guide microstructures by using a diamond turning station provided with a drum that can be rotated about an axis C and a diamond tip, each microstructure having a prismatic shape with two surfaces with a first surface here called active surface intended to receive a semi-reflective treatment to extract an image injected and propagated by successive total internal reflections in the optical guide, and a second surface called passive surface without reflective treatment, the microstructures being juxtaposed with each other, the manufacturing method comprising the following steps:
  installing a piece P to be machined on the drum as follows:
    the piece P to be machined is offset by a distance D from the rotation axis of the drum, the distance D being the distance that separates the axis C and a reference frame fixed in relation to the microstructures to be machined;
    the piece P to be machined is placed so that there is a mean angle Theta between the axis C and a cutting profile corresponding to the active surfaces, the angle Theta being as follows:

Theta=arccos (D/Ry)

where Ry is a required radius of curvature in the long direction of the microstructures;
  moving the diamond tip along the cutting profile of the microstructures by actuating the rotation of the drum so as to machine all the microstructures on the surface of the piece P to be machined.

2. Method according to claim 1, wherein said fixed reference frame is the geometric center of all the microstructures to be machined.

3. Method according to claim 1, wherein the radius Ry tends towards infinity and the piece P to be machined is placed at a mean angle Theta equal to 90° so as to form planar active surfaces.

4. Method according to claim 1, wherein the cutting profile of the active surfaces forms an arc of a circle of radius Rx and the piece P to be machined is placed at a mean angle Theta of less than 90° so as to form concave active surfaces.

5. Method according to claim 1, wherein the cutting profile of the active surfaces forms an arc of a circle of a radius Rx and the piece P to be machined is placed at a mean angle Theta greater than 90° so as to form convex active surfaces.

6. Method according to claim 4, wherein the radius Rx and the radius Ry have the same value.

7. Method according to claim 4, wherein the radius Rx and the radius Ry have different values.

8. Method for manufacturing an optical guide comprising the following steps:
  manufacturing a first piece on a face of which a set of microstructures is formed by applying the method according to claim 1;
  applying a semi-reflective treatment to the surfaces of the microstructures intended to extract an image injected and propagated by successive total internal reflections in the optical guide;
  manufacturing a second piece on a face of which a set of microstructures complementary to the microstructures of the first piece is formed;
  gluing the first piece and the second piece together, the microstructures on the face of the first piece being glued facing their complementary microstructures on the face of the second piece.

9. Method according to claim 8, comprising the following steps for manufacturing the second piece:
  installing another piece P' to be machined on the drum as follows:
    the other piece P' to be machined is offset by a distance D' from the rotation axis of the drum, the distance D' being identical to the distance D used for manufacturing the first piece;
    the other piece P' to be machined is placed so that there is a mean angle Omega between the axis C and another cutting profile corresponding to the surfaces intended to be placed facing the active surfaces of the microstructures of the first piece, the angle Omega being as follows:

Omega=π-Theta=π-arccos (D/Ry)

moving the diamond tip along said other cutting profile of the microstructures by actuating the rotation of the drum so as to machine all the microstructures on the surface of the other piece P' to be machined, said other cutting profile being geometrically complementary to the cutting profile used for machining the first piece.

10. Method for manufacturing an optical device comprising the following steps:
  manufacturing an optical guide by applying the method according to claim 8; and
  assembling the optical guide and a collimation device, so that the collimation device injects an image, in the form of a beam collimated to infinity, through an injection zone of the optical guide, so that this image is transported by successive total internal reflections as far as an extraction zone of the optical guide where the glued microstructures are arranged to extract the image from the optical guide in see-through superimposition.

11. A method for manufacturing a moulding insert of a set of optical-guide microstructures, by using a diamond turning station provided with a drum that can be rotated about an axis C and a diamond tip, each microstructure having a prismatic shape with two surfaces with a first surface here called active surface intended to receive a semi-reflective treatment to extract an image injected and propagated by successive total internal reflections in the optical guide, and a second surface called passive surface without reflective treatment, the microstructures being juxtaposed with each other, the moulding insert having a complementary shape with respect to the set of optical-guide microstructures, the manufacturing method comprising the following steps:
  installing a piece P to be machined on the drum as follows:
    the piece P to be machined is offset by a distance D from the rotation axis of the drum, the distance D being the distance that separates the axis C and a reference frame fixed in relation to the complementary shape of the microstructures which has to be machined;
    the piece P to be machined is placed so that there is a mean angle Omega between the axis C and a cutting profile corresponding to the complementary shape of the active surfaces, the angle Omega being as follows:

Omega=π-arccos (D/Ry)

where Ry is a required radius of curvature in the long direction of the microstructures;
  moving the diamond tip along the cutting profile of the complementary shape of the microstructures by actuating the rotation of the drum so as to machine all the microstructures on the surface of the piece P to be machined.

12. A method for manufacturing a moulding insert of a complementary shape of a set of optical-guide microstructures, by using a diamond turning station provided with a drum that can be rotated about an axis C and a diamond tip, each microstructure having a prismatic shape with two surfaces with a first surface here called active surface intended to receive a semi-reflective treatment to extract an image injected and propagated by successive total internal reflections in the optical guide, and a second surface called passive surface without reflective treatment, the microstructures being juxtaposed with each other, the moulding insert having a shape corresponding to the set of optical-guide microstructures, the manufacturing method comprising the following steps:

installing a piece P to be machined on the drum as follows:

the piece P to be machined is offset by a distance D from the rotation axis of the drum, the distance D being the distance that separates the axis C and a reference frame fixed in relation to the shape of the microstructures which has to be machined on the moulding insert;

the piece P to be machined is placed so that there is a mean angle Theta between the axis C and a cutting profile corresponding to the shape of the active surfaces, the angle Theta being as follows:

$$\text{Theta} = \arccos(D/Ry)$$

where Ry is a required radius of curvature in the long direction of the microstructures;

moving the diamond tip along the cutting profile of the shape of the microstructures on the moulding insert by actuating the rotation of the drum so as to machine all the microstructures on the surface of the piece P to be machined.

\* \* \* \* \*